United States Patent [19]

Covey

[11] 4,145,244

[45] Mar. 20, 1979

[54] PORTABLE TRANSFER TOY

[76] Inventor: Leylan V. Covey, 2429 Tremont St., Colorado Springs, Colo. 80907

[21] Appl. No.: 817,569

[22] Filed: Jul. 21, 1977

[51] Int. Cl.$^2$ .............................................. B32B 35/00

[52] U.S. Cl. .................................... 156/541; 15/21 R; 156/230; 156/240; 156/540; 156/579

[58] Field of Search ............... 156/487, 540, 579, 580, 156/581, 230, 240, 234, 235, 277, 541; 15/21 R; 427/146

[56] References Cited

U.S. PATENT DOCUMENTS

| | | | |
|---|---|---|---|
| 772,822 | 10/1904 | Peterson | 15/21 R |
| 1,128,543 | 2/1915 | Stock | 156/487 |
| 2,119,371 | 5/1938 | Von Hofe | 156/487 X |
| 2,213,707 | 9/1940 | Jorke | 156/580 X |
| 2,819,196 | 1/1958 | Munro | 156/234 |
| 2,855,297 | 10/1958 | Saunders | 156/235 X |
| 3,258,385 | 6/1966 | Lake | 156/581 |

FOREIGN PATENT DOCUMENTS

| | | | |
|---|---|---|---|
| 962138 | 2/1975 | Canada | 156/240 |

*Primary Examiner*—John T. Goolkasian
*Assistant Examiner*—Thomas Bokan
*Attorney, Agent, or Firm*—W. Britton Moore

[57] ABSTRACT

A portable transfer toy for children including a casing with a hinged and slotted cover having a flat base platen surface therein for receiving a sheet of paper with printing and/or caricatures thereon upon which a sheet of waxed paper is disposed. A quill holder having a handle projecting vertically through the slotted cover and formed with a multiplicity of flexible depending fingers is reciprocated over the waxed paper to effect transposal of the printing from the paper sheet to the waxed paper. Thereafter, the former is removed and replaced with a clear sheet of paper, and the quill holder reciprocated to transpose the printing from the waxed paper to the paper sheet.

7 Claims, 6 Drawing Figures

PORTABLE TRANSFER TOY

This invention relates to a portable transfer toy for transposing printing and/or caricatures from comics and the like to waxed paper and thence to clear paper.

While various complex and expensive copying machines are presently available, this is a simple and inexpensive device in the nature of a toy which is readily understandable to and manually operable by children for transposing printing and/or caricatures from comics and the like to clear paper for amusement and educational purposes.

The principal object of the present invention is to provide a compact portable device wherein printing may be readily manually transposed by simple reciprocatory sliding movements from a sheet of comics and the like to waxed paper and thence to a sheet of clear paper.

Another object is the provision of a casing including a hinged slotted cover and having a flat base platen surface therein for accommodating a sheet of comics with a sheet of waxed paper superposed thereon, and wherein a quill holder with a handle extending vertically through the slotted cover and formed with a multiplicity of flexible depending fingers may be manually reciprocated over the waxed paper to transpose the printing thereto, after which the comic sheet is replaced with a clear sheet of paper and the operation repeated to effect transposition to the latter.

A further object is the provision of a relatively small, compact, portable, and inexpensive device of simple construction and which may be readily operated to the amusement and education of children to transpose printing and/or caricatures from one sheet to another.

Still another object is to provide a novel quill holder having an upright handle and a multiplicity of downwardly depending flexible fingers integrally formed thereon and adapted to engage and be slidably rubbed over a waxed sheet of paper to transpose printing and/or caricatures from an underlying sheet, and thence to a sheet of clear paper.

These and other objects and advantages will be apparent as the following specification is considered with the accompanying drawings, wherein FIG. 1 is a perspective view of the casing showing the quill holder handle operatively extending through the hinged slotted cover, and the latter closed and latched;

Figure 1:
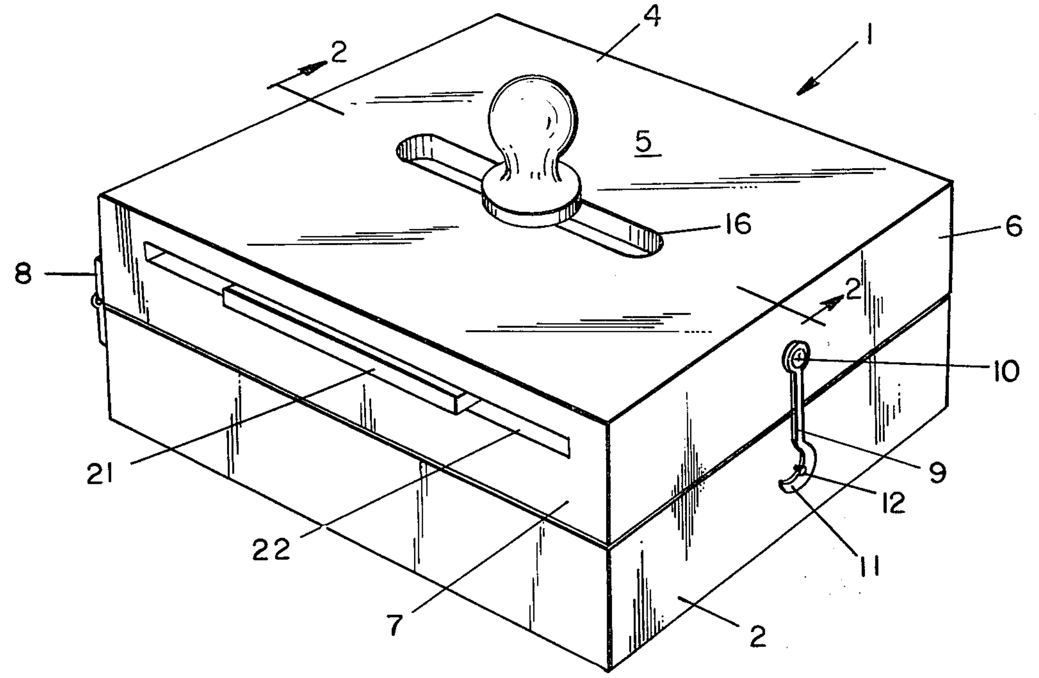

Referring more particularly to the drawings, wherein similar reference characters designate like parts throughout the several views, numeral 1 relates to a generally rectangular casing of wood or some suitable plastic having a base or platen 2 with a flat upper base platen surface 3. A cover 4 having a flat top 5 and downwardly depending ends 6 and sides 7 is suitably hinged, as at 8, to one end of the base. The other end of the cover 4 may have a latch member 9 pivoted thereto as at 10, and depending therebelow so that a curved lower end 11 thereon may latchingly engage with a headed bolt 12 on the corresponding end of the base for latching the cover and base together, in an obvious manner.

A handle 15 of a quill holder 13 projects upwardly and centrally of the generally rectangular flat plate 14 thereof and is adapted to be received in and project upwardly through an elongated slot 16, formed in the flat top 5 of the cover and extending endwise but spaced from the ends 6 thereof. The handle is generally cylindrical so that the post 17 thereof loosely fits in slot 16 and terminates at its upper end with a knob 18 which flares inwardly and downwardly to a circular disc 19. The ends of the quill holder plate 14 are reduced, as at 20, to provide guiding flanges 21 which project through elongated slots 22 formed in the sides 7 of the casing cover and serve to support the quill holder in slidable position therebelow. It will be noted that the handle disc 19 extends beyond the slot 16 and flatly engages the top face of the cover, so that the handle may be manually moved relative to the slot 16 and the flanges 21 will slide within the side slots 22 enabling the quill holder to reciprocate relative and parallel to the cover, as hereinafter will be described.

Suitably fixedly attached to and depending downwardly from the underside of quill holder plate 14 are a multiplicity of flexible quill-like fingers 23 which extend a distance therebelow sufficient so that the tapered ends 24 thereof contact the flat upper surface 3 of the platen. The quill holder may be formed of the same material as the casing, and the quill-like fingers 23 may be of rubber or other suitable flexible material and suitably anchored in the plate 14, generally in the manner of brush bristles. The fingers are larger in diameter than bristles and tapered so as to be somewhat stiffer and yet flexible. It may be found desirable to form the entire quill holder assembly unitarily in a suitable plastic forming machine with the fingers constituting an integral part of the holder. The pattern of quill-like fingers will cover the entire underside of the holder, except the guiding flanges 21, so as to insure the application of pressure over the entire surface of material placed between the quill holder and platen, as presently described.

Figure 2:
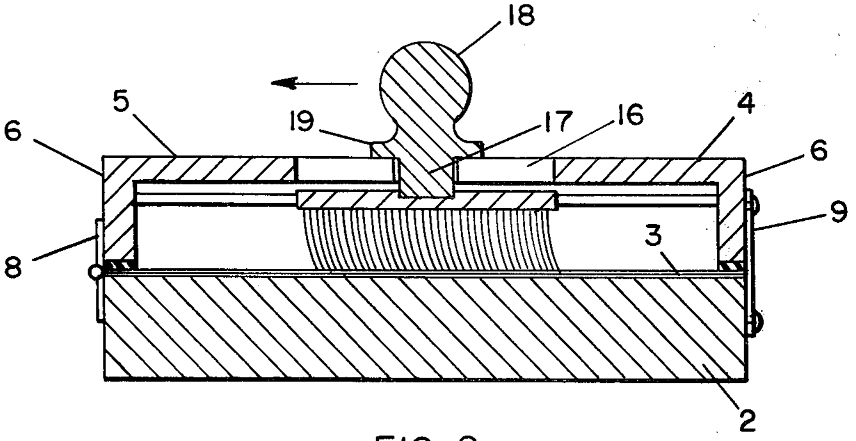
FIG. 2 is a section on the line 2—2 of FIG. 1, showing the positions assumed by the quill fingers during movement of the latter from right to left.
Figure 3:
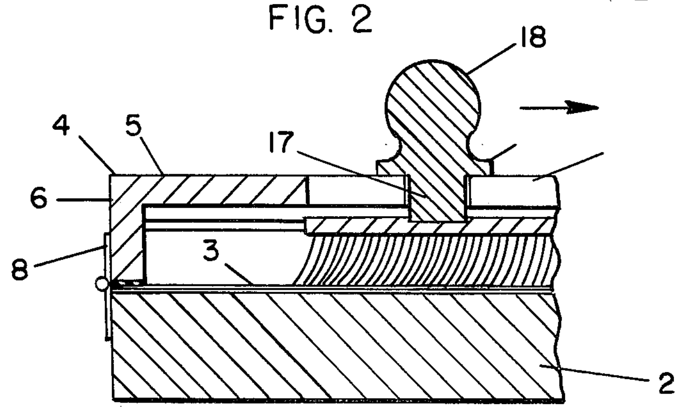
FIG. 3 is a partial section, similar to FIG. 2, showing positions assumed by the quill fingers during movement from left to right.
Figure 4:
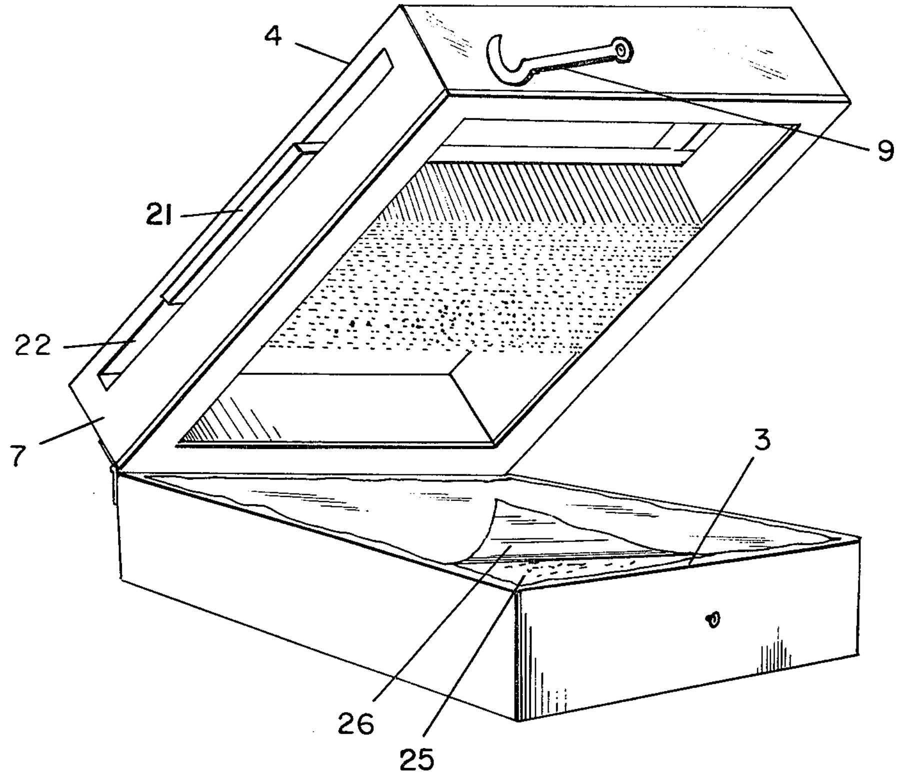
FIG. 4 is a perspective view of the casing with the cover open and superposed sheet of waxed paper and a printed sheet arranged on the base platen surface, prior to transposition from one to another.
Figure 5:
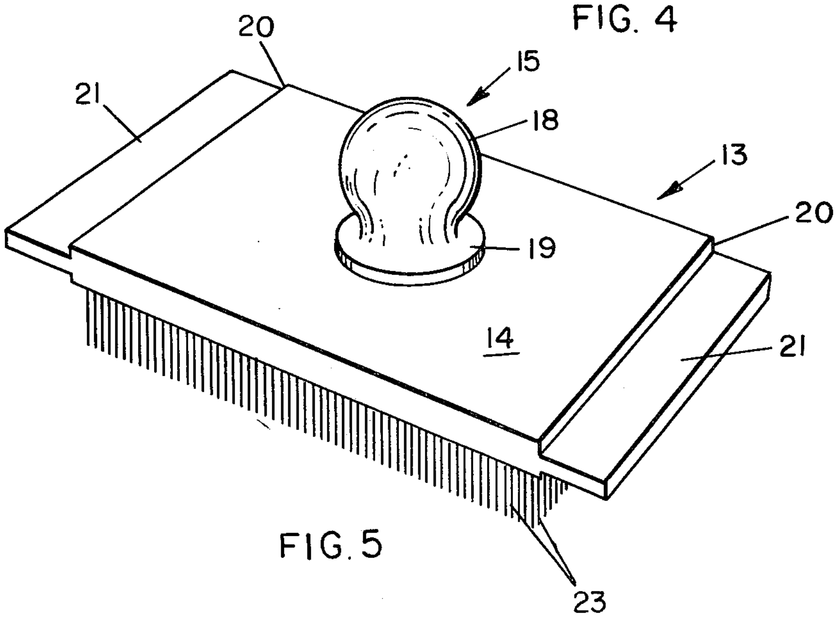
FIG. 5 is a perspective view of the quill holder.
Figure 6:
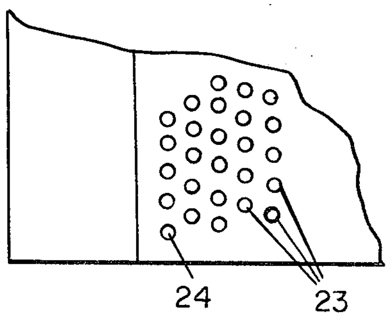
FIG. 6 is a bottom plan view of the quill holder.

When it is desired to effect copying, a sheet of paper 25 (FIG. 4) such as comics having printing and caricatures thereon, is flatly disposed face up on the flat upper surface 3 of the platen, and a similar sheet of wax paper 26 is superposed thereon and to match therewith. The cover 4 will then be closed and latched so that the fingers 23 of the quill holder will be caused to press against the top surface of the wax paper and be bent or distorted, as best shown in FIGS. 2 and 3, because of their flexibility and being of greater length than the distance between the quill holder and the platen. The handle 15 of the quill holder is then reciprocated in cover slot 16 so that pressure from the fingers 23 is exerted on the two sheets of paper 25-26 images from the bottommost sheet 25 are transferred to the wax paper sheet 26. During this fore and aft movement of the quill holder, it will be noted that the fingers 23 will bend or flex rearwardly in the forward and rearward travel, respectively, and thereby apply uniform pressure throughout the paper sheets as the fingers are brushed thereover.

After the aforesaid operation is completed, the cover is unlatched and opened and the sheet 25, from which the images have been transposed to wax sheet 26, is removed and replaced with a clean or unmarked sheet of paper, not shown, so that it will be covered by the wax sheet 26. The cover is then closed and relatched and movements of the quill holder repeated which results in the quill fingers applying pressure against the sheets and causes the images on the wax paper 26 to be transferred to the clean sheet of paper, in an obvious manner. Thereafter, the cover is reopened and the latter sheet removed for viewing by and to the delight of the child.

While a preferred form of my portable transfer toy has been shown and described, it is to be understood that various changes and improvements may be made therein without departing from the scope and spirit of the appended claims.

What I claim:

1. A portable transfer toy comprising a casing having a flat base platen member and a slotted cover hinged thereto, quill holder means arranged within said cover and having handle means disposed in the slot thereof, a multiplicity of quill-like flexible fingers depending from said quill holder means, a first sheet of paper having images to be copied being disposed on said base platen member and a second sheet of wax paper superposed thereon, whereby when said cover is closed and said quill holder reciprocated in said slot relative thereto pressure from said fingers is applied to said sheets and images from said first sheet are transferred to said second sheet, after which said first sheet is removed and replaced by a third unmarked sheet of paper and the operation repeated to transfer the images from said second sheet to said third sheet.

2. A portable transfer toy, according to claim 1, wherein said casing is generally rectangular and said cover is hinged at one end to said base platen member.

3. A portable transfer toy, according to claim 2, wherein the slot in said cover is centrally arranged and extends longitudinally and is spaced from the opposing ends thereof, and said handle means projects upwardly through said slot.

4. A portable transfer toy, according to claim 3, wherein said cover has a downwardly depending peripheral flange, elongated slots in opposing sides of said flange, said quill holder having guide flanges thereon interfitting said cover flange slots whereby said quill holder is retained for reciprocatory movement within and relative to said cover and base platen.

5. A portable transfer toy, according to claim 4, wherein said quill-like fingers are fixedly anchored in said quill holder and are tapered downwardly, said fingers being of greater length than the distance between said quill holder and said base platen whereby they will flex when said cover is closed.

6. A portable transfer toy, according to claim 5, wherein said cover has latch means thereon for holding the cover in closed position relative to said base platen, and said flexible fingers will bend and apply brushing pressure against reciprocatory movement of said quill holder.

7. A portable transfer toy, according to claim 4, wherein said quill holder includes a flat top plate and an upwardly extending handle means, and said guide flanges are reduced and project laterally from the sides of said plate.

* * * * *